United States Patent
Kawase et al.

(10) Patent No.: US 11,549,301 B2
(45) Date of Patent: Jan. 10, 2023

(54) PINCH DETECTION SENSOR

(71) Applicant: Hitachi Metals, Ltd., Tokyo (JP)

(72) Inventors: Kenji Kawase, Tokyo (JP); Shuichi Suzuki, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 832 days.

(21) Appl. No.: 16/448,770

(22) Filed: Jun. 21, 2019

(65) Prior Publication Data

US 2019/0390501 A1    Dec. 26, 2019

(30) Foreign Application Priority Data

Jun. 25, 2018    (JP) .............................. JP2018-120052

(51) Int. Cl.
*E05F 15/44*        (2015.01)
*B60J 5/06*         (2006.01)
(Continued)

(52) U.S. Cl.
CPC ................. *E05F 15/44* (2015.01); *B60J 5/06* (2013.01); *E06B 7/23* (2013.01); *H01H 3/142* (2013.01);
(Continued)

(58) Field of Classification Search
CPC ................................. E05D 15/44; E05D 15/48
See application file for complete search history.

(56) References Cited

U.S. PATENT DOCUMENTS

| 4,532,388 A | * | 7/1985 | Sackmann | .............. | H01H 3/142 |
| | | | | | 200/61.43 |
| 4,684,768 A | * | 8/1987 | Sackmann | .............. | E05F 15/44 |
| | | | | | 200/61.43 |

(Continued)

FOREIGN PATENT DOCUMENTS

| DE | 32 32 365 A1 | 3/1984 | | |
| DE | 102017005514 A1 | * | 12/2018 | .............. E05F 15/44 |

(Continued)

OTHER PUBLICATIONS

Machine translation of DE-102017005514-A1.*

(Continued)

*Primary Examiner* — Marcus Menezes
(74) *Attorney, Agent, or Firm* — McGinn I.P. Law Group, PLLC.

(57) ABSTRACT

A pinch detection sensor, for detecting the occurrence of pinch during closing of a sliding door, includes a door front edge rubber including a hollow portion inside, to be attached to a front edge portion of the sliding door in a closing movement direction of the sliding door, and a plurality of linear shape pressure sensing members accommodated in the hollow portion, each linear shape pressure sensing member comprising a tubular elastic body and respective conductor wires spaced apart from each other in an inner side of the tubular elastic body. The door front edge rubber includes, in the hollow portion, a plurality of housing spaces, which accommodate the plurality of linear shape pressure sensing members, respectively. Movements of the linear shape pressure sensing members between the plurality of housing spaces are restricted by a partitioning portion.

17 Claims, 11 Drawing Sheets

(51) Int. Cl.
   *E06B 7/23* (2006.01)
   *H01H 3/14* (2006.01)
   *H01H 3/16* (2006.01)
(52) U.S. Cl.
   CPC ........ H01H 3/161 (2013.01); *E05Y 2900/531* (2013.01)

(56) References Cited

U.S. PATENT DOCUMENTS

| | | | | |
|---|---|---|---|---|
| 5,433,031 | A * | 7/1995 | Dailey | E05F 15/40 49/27 |
| 5,834,719 | A * | 11/1998 | Kaji | B60J 10/00 200/61.43 |
| 10,569,627 | B2 * | 2/2020 | Baba | B60J 10/277 |
| 10,662,693 | B2 * | 5/2020 | Kawase | E05F 15/44 |
| 11,225,818 | B2 * | 1/2022 | Akimoto | E05F 15/44 |
| 11,261,643 | B2 * | 3/2022 | Kawase | E05F 15/42 |
| 2009/0267786 | A1 * | 10/2009 | Sakamaki | E05F 15/44 49/360 |
| 2011/0011004 | A1 * | 1/2011 | Courrian | B61D 19/026 49/483.1 |
| 2011/0169513 | A1 * | 7/2011 | Bolbocianu | E05F 15/443 324/705 |
| 2011/0185819 | A1 * | 8/2011 | Hattori | E05F 15/44 29/595 |
| 2013/0307567 | A1 * | 11/2013 | Bolbocianu | G01D 11/30 324/661 |
| 2014/0318934 | A1 * | 10/2014 | Aoyama | E05F 15/443 200/61.42 |
| 2015/0007745 | A1 * | 1/2015 | Kawashima | B61D 19/026 105/343 |
| 2018/0013427 | A1 * | 1/2018 | Okada | H03K 17/955 |
| 2019/0186190 | A1 * | 6/2019 | Akimoto | H01H 3/142 |
| 2019/0338577 | A1 | 11/2019 | Kawase et al. | |
| 2019/0390501 | A1 | 12/2019 | Kawase et al. | |
| 2020/0388446 | A1 * | 12/2020 | Sugita | G01L 1/04 |
| 2021/0002941 | A1 * | 1/2021 | Akimoto | E05F 15/44 |

FOREIGN PATENT DOCUMENTS

| | | | | |
|---|---|---|---|---|
| EP | 3 533 964 | A1 | 9/2019 | |
| EP | 3533964 | A1 * | 9/2019 | ............. E05F 15/40 |
| EP | 3 564 472 | A1 | 11/2019 | |
| GB | 2348052 | A * | 9/2000 | ............. H01H 3/142 |
| JP | 3107973 | U | 4/2005 | |
| JP | 2011-158336 | A | 8/2011 | |
| JP | 2014-216300 | A | 11/2014 | |
| JP | 2017062153 | A * | 3/2017 | |
| JP | 2017-089247 | A | 5/2017 | |
| JP | 6516052 | B1 | 5/2019 | |
| WO | WO-2005073685 | A1 * | 8/2005 | ............. D02G 3/441 |

OTHER PUBLICATIONS

Japanese Office Action, dated Feb. 6, 2020, in Japanese Application No. 2619-678245 and English Translation thereof.
Extended European Search Report dated Dec. 12, 2019 for European Patent Application No. 19181914.3-1005.
Japanese Office Action, dated Oct. 16, 2018, in Japanese Application No. 2018-120052 and English Translation thereof.

* cited by examiner

PINCH DETECTION SENSOR

CROSS-REFERENCE TO RELATED APPLICATION

The present application is based on Japanese patent application No. 2018-120052 filed on Jun. 25, 2018, the entire contents of which are incorporated herein by reference.

BACKGROUND OF THE INVENTION

1. Field of the Invention

The present invention relates to a pinch detection sensor for detecting the occurrence of pinch during closing of a sliding door.

2. Description of the Related Art

Conventionally, in a train vehicle doorway to allow passenger entry and exit, there are provided sliding doors that slide in train vehicle front and rear directions. Such train vehicle sliding doors are provided with a structure for detecting the occurrence of passenger's body or belongings pinch in the sliding doors during closing of the sliding doors (see, e.g., JP-A-2017-89247).

The door pinch detecting device described in JP-A-2017-89247 includes hollow door front edge rubber outer members, which are attached to front edges in closing directions of sliding doors, respectively, of a train vehicle, door front edge rubber inner members, which are detachably accommodated in hollow portions of the door front edge rubber outer members respectively, and piezoelectric members, which are fixed to front edges of the door front edge rubber inner members, respectively, to act as a foreign object detection sensor. When foreign object pinch in the sliding doors occurs, the piezoelectric members convert the deformation of the door front edge rubber inner members into an electric signal and output that electric signal, which is amplified and sent to an alarm device to generate an alarm. In response to that alarm, a trainman then opens the sliding doors to remove the pinched object.

On the other hand, the present applicant has suggested a cord switch (i.e. cord-shape switch type detection sensor) for detecting the occurrence of pinch in an automobile sliding door as described in e.g. JP-A-2014-216300. This cord switch includes a cord switch main body with a plurality of conductor wires helically spaced apart from each other in an inner side of a tubular member, a member to be attached, which has an elastic modulus higher than an elastic modulus of the tubular member of the cord switch main body, and which is disposed along the cord switch main body, and a band-like impact absorbing member, which is interposed between the cord switch main body and the member to be attached, and which has an elastic modulus lower than an elastic modulus of the tubular member of the cord switch main body. With this cord switch, it is possible to detect pressures in all radial directions of the tubular member.
[Patent Document 1] JP-A-2017-89247
[Patent Document 2] JP-A-2014-216300

SUMMARY OF THE INVENTION

Although the door pinch detecting device described in JP-A-2017-89247 can precisely detect the occurrence of pinch when the piezoelectric members are acted on by pressure in moving directions of the sliding doors during closing of the sliding doors, the piezoelectric members may not necessarily securely react when acted on by an external force at oblique angles to the moving directions of the sliding doors during closing of the sliding doors, or when the pinched foreign object is a thin string-like object. For this reason, for example, when a passenger with belongings such as a main body object (e.g. a pass holder for holding cards, or the like) coupled to a tip of a string-like object exits from a train vehicle, if the string-like object is pinched in the sliding doors, and the passenger pulls the string-like object from the vehicle exterior, no alarm is generated, and the train vehicle may depart with the string-like object remaining pinched.

Even in the event of such pinch, in order to be able to detect the occurrence of pinch, the present inventors have considered, in the cord switch described in JP-A-2014-216300, accommodating a plurality of the cord switch main bodies within a hollow portion of a door front edge rubber. In this case, however, when no proper hollow space is ensured by making the capacity of the hollow portion larger than its size required to accommodate the plurality of cord switch main bodies, the cushionability lowers, and in the event of passenger's body pinch, the passenger is subjected to a great impact. Further, if the hollow portion is too large, the locations of each of the cord switch main bodies within the hollow portion are not fixed, and no secure detection of various types of occurrence of pinch may be able to be performed.

Accordingly, it is an object of the present invention to provide a pinch detection sensor, which, during closing of a sliding door, is able to detect the occurrence of pinch, even when acted on by an external force at oblique angles to a moving direction of the sliding door.

For the purpose of solving the above-described problem, the present invention provides a pinch detection sensor, for detecting the occurrence of pinch during closing of a sliding door, comprising: a door front edge rubber including a hollow portion inside, to be attached to a front edge portion of the sliding door in a closing movement direction of the sliding door; and a plurality of linear shape pressure sensing members accommodated in the hollow portion, each linear shape pressure sensing member comprising a tubular elastic body and respective conductor wires spaced apart from each other in an inner side of the tubular elastic body; wherein the door front edge rubber includes, in the hollow portion, a plurality of housing spaces, which accommodate the plurality of linear shape pressure sensing members, respectively, wherein movements of the linear shape pressure sensing members between the plurality of housing spaces are restricted by a partitioning portion.

POINTS OF THE INVENTION

The pinch detection sensor according to the present invention makes it possible to, during closing of the sliding door, detect the occurrence of pinch, even when acted on by an external force at oblique angles to the moving direction of the sliding door.

DETAILED DESCRIPTION OF THE PREFERRED EMBODIMENTS

First Embodiment

Figure 1:
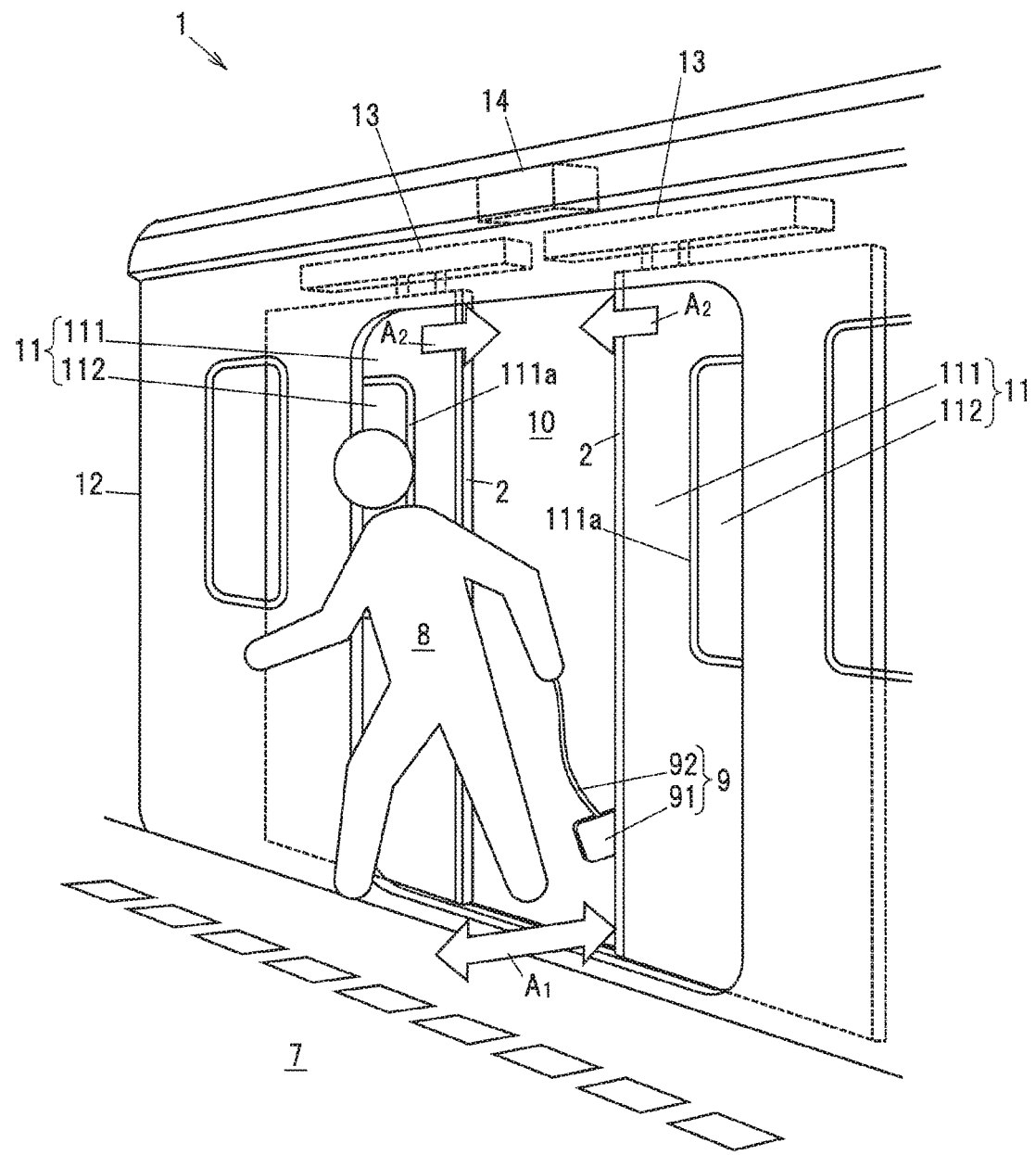
FIG. 1 is an explanatory view showing a train vehicle doorway with a pinch detection sensor according to a first embodiment of the present invention attached to left and right sliding doors thereof.

FIG. 1 is an explanatory view showing a doorway 10 of a train vehicle 1 with pinch detection sensors 2 according to a first embodiment of the present invention being attached to left and right sliding doors 11 and 11, respectively, of the doorway 10. In FIG. 1, there are shown a passenger 8 exiting from the train vehicle 1 to a station platform 7 and belongings 9 of the passenger 8. Further, in FIG. 1, entry and exit directions of the passenger 8 are indicated by arrows $A_1$, while moving directions (closing directions) during closing of the sliding doors 11 and 11 are indicated by arrows $A_2$.

The moving directions of the sliding doors 11 and 11 are parallel to a forward movement direction of the train vehicle 1. The entry and exit directions of the passenger 8 are perpendicular to the forward movement direction of the train vehicle 1 and parallel to thickness directions of the sliding doors 11 and 11. Each sliding door 11 includes a door plate 111 and a window glass 112 fitted in a window section 111a of the door plate 111.

The belongings 9 include, for example, a main body object 91 such as a pass holder for holding cards, and a string-like object 92 which is coupled to the main body object 91 at one end thereof. The other end of the string-like object 92 is gripped by the passenger 8. Note that the other end of the string-like object 92 may be suspended by a belt or the like of the passenger 8, for example.

By driving devices 13 and 13 which are provided in a vehicle body 12, the sliding doors 11 and 11 are slid in front and rear directions of the vehicle body 12 to open and close the doorway 10. The driving devices 13 and 13 are disposed above the doorway 10, and are configured to include a linear motion mechanism such as a linear motor and a ball screw, for example. Further, the driving devices 13 and 13 are controlled by a control device 14. The movement ranges (the positions of forward and backward movement ends) of the sliding doors 11 and 11 are defined by stoppers (not shown) which are provided in the driving devices 13 and 13.

The pinch detection sensors 2 are vertically attached to respective edge portions of the left and right sliding doors 11 and 11 opposite each other, and during closing of the sliding doors 11 and 11, in the event of pinch of the passenger 8 or their belongings 9 therebetween, the pinch detection sensors 2 detect that occurrence of pinch. When the control device 14 receives a signal indicating that occurrence of pinch from the pinch detection sensors 2, the control device 14 controls the driving devices 13 and 13 for opening the sliding doors 11 and 11. Note that when the control device 14 receives a signal indicating the occurrence of pinch from the pinch detection sensors 2, the control device 14 may generate an alarm signal to give an alarm to a trainman such as a driver or a conductor. In this case, the sliding doors 11 and 11 are opened by being operated by the trainman.

Figure 2:
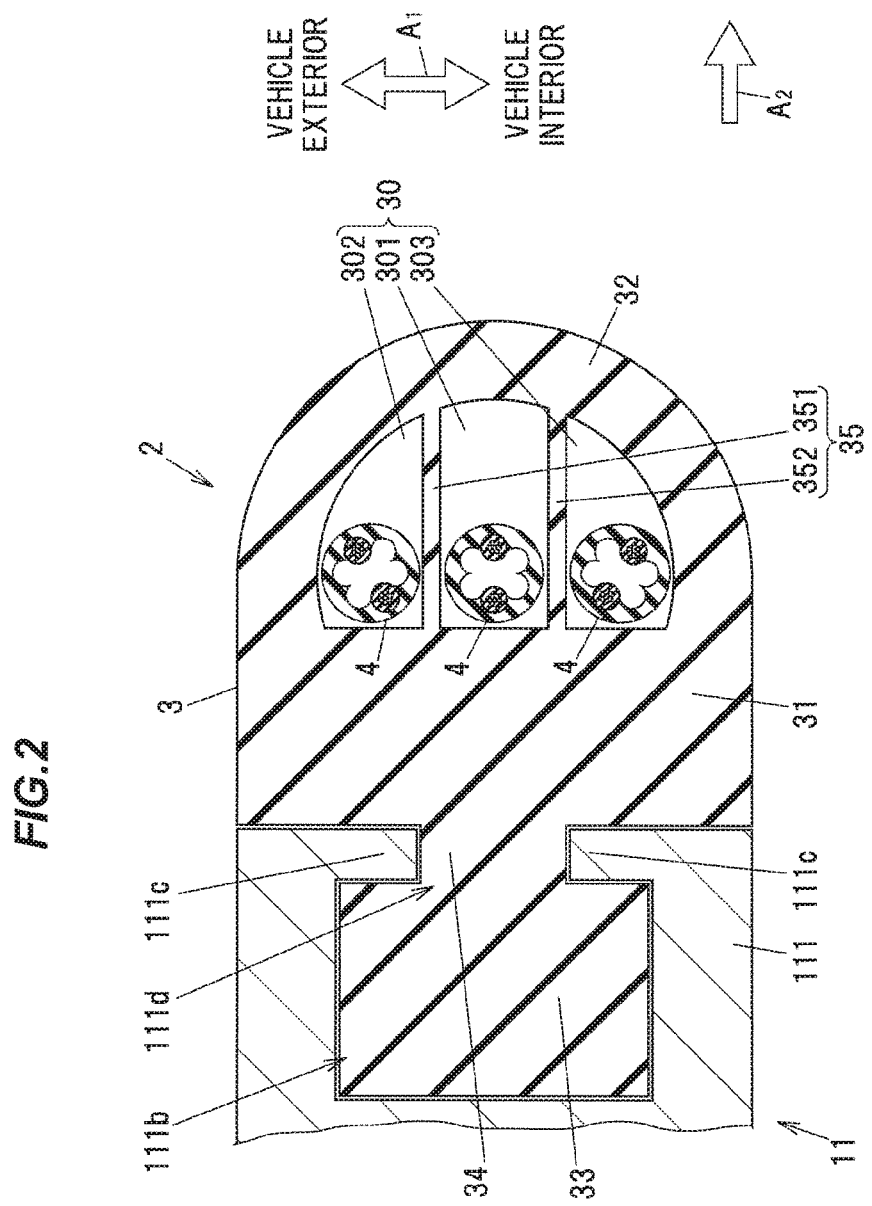
FIG. 2 is a cross-sectional view showing the pinch detection sensor.

FIG. 2 is a cross-sectional view showing the pinch detection sensor 2 in a natural condition when not subjected to occurrence of pinch. In FIG. 2, the pinch detection sensor 2 is indicated by a cross section parallel to the entry and exit directions $A_1$ of the passenger 8 and the closing directions $A_2$ of the sliding doors 11 and 11 (in other words, a cross section at right angles to a longitudinal direction of the pinch detection sensor 2). Further, in FIG. 2, the upper side of the drawing corresponds to the vehicle exterior side (platform 7 side) of the train vehicle 1, while the lower side of the drawing corresponds to the vehicle interior side.

The pinch detection sensor 2 includes a door front edge rubber 3, which is attached to a front edge portion of the sliding door 11 in the closing direction of the sliding door 11, and a plurality of linear shape pressure sensing members 4. The door front edge rubber 3 has a hollow portion 30 inside, and the plurality of linear shape pressure sensing members 4 are being accommodated in the hollow portion 30. In the present embodiment, three of the linear shape pressure sensing members 4 are accommodated in the hollow portion 30.

The door plate 111 is vertically formed with a mating groove 111b for attaching the door front edge rubber 3. The mating groove 111b is open in the closing direction of the sliding door 11 through an opening 111d between one pair of protruding pieces 111c and 111c opposite each other.

The door front edge rubber 3 integrally includes, in the cross section shown in FIG. 2, a rectangular base section 31, a cover section 32, which covers the three linear shape pressure sensing members 4 in the closing direction of the sliding door 11 relative to the hollow portion 30, a mating portion 33, which is mated into the mating groove 111b of the door plate 111, and a connecting portion 34, which connects the base section 31 and the mating portion 33. The door front edge rubber 3 is made of, for example, urethane rubber, EP rubber, silicone rubber, styrene butadiene rubber, chloroprene rubber, olefin based or styrene based thermoplastic elastomer, urethane resin or the like, and is formed by extrusion molding.

The base section 31 is disposed on the one pair of protruding pieces 111c and 111c of the door plate 111 in the closing direction of the sliding door 11, and forms the hollow portion 30 between that base section 31 and the cover section 32. The cover section 32 is curved in an arch shape (a semicircular shape) protruding in the closing direction of the sliding door 11 in a middle portion in the passenger entry and exit directions, and is continuous with the base section 31 at both end portions of the cover section 32. The connecting portion 34 is disposed in the opening 111d of the door plate 111.

Further, the door front edge rubber 3 includes a partitioning portion 35 between the base section 31 and the cover section 32, which partitions the hollow portion 30 into a plurality (three in the present embodiment) of housing spaces 301 to 303. Hereinafter, the three housing spaces 301 to 303 will be referred to as the first to third housing spaces 301, 302, and 303, respectively. The first to third housing spaces 301, 302, and 303 are being aligned in the passenger entry and exit directions, in such a manner that the first housing space 301 is being formed in the middle portion in the passenger entry and exit directions, the second housing space 302 is being formed on the vehicle exterior side relative to the first housing space 301, and the third housing space 303 is being formed on the vehicle interior side relative to the first housing space 301.

The partitioning portion 35 includes a first wall section 351 that partitions the first housing space 301 and the second housing space 302, and a second wall section 352 that partitions the first housing space 301 and the third housing space 303. The first wall section 351 and the second wall section 352 are being provided parallel to each other in the moving direction of the sliding door 11. Further, the first wall section 351 and the second wall section 352 are continuous with the base section 31 at their respective one end portions, while being continuous with the cover section 32 at their respective other end portions. This results in the first to third housing spaces 301, 302, and 303 being partitioned with no gap therebetween by the partitioning portion 35. The three linear shape pressure sensing members 4 are being accommodated in the first to third housing spaces 301, 302, and 303, respectively.

In this manner, in the present embodiment, the door front edge rubber 3 includes, in the hollow portion 30, the first to third housing spaces 301, 302, and 303 for accommodating the plurality of linear shape pressure sensing members 4 respectively, so that movements of the linear shape pressure sensing members 4 between the first to third housing spaces 301, 302, and 303 are restricted by the partitioning portion 35.

Of the area occupied by the first housing space 301 in the cross section shown in FIG. 2, the area of the hollow space excluding the portion where the linear shape pressure sensing member 4 is disposed is greater than the area of the portion where the linear shape pressure sensing member 4 is disposed. That is, when the proportion of the hollow space in the first housing space 301 is defined as the space ratio, this space ratio is 50% or more. This results in impact relaxation when the door front edge rubber 3 collides with the passenger 8 body during closing of the sliding doors 11 and 11.

In the present embodiment, the space ratios of the second and third housing spaces 302 and 303 are also 50% or more. It should be noted, however, that the space ratios of the second and third housing spaces 302 and 303 are lower than the space ratio of the first housing space. The desirable range of the space ratio of the first housing space is 50% or more and 80% or less, while the desirable ranges of the space ratios of the second and third housing spaces 302 and 303 are 40% or more and 70% or less. This is because if the space ratios are too low, the cushionability lowers, or if the space ratios are too high, the locations of the linear shape pressure sensing members 4 may be not fixed in appropriate ranges.

Figure 3A:
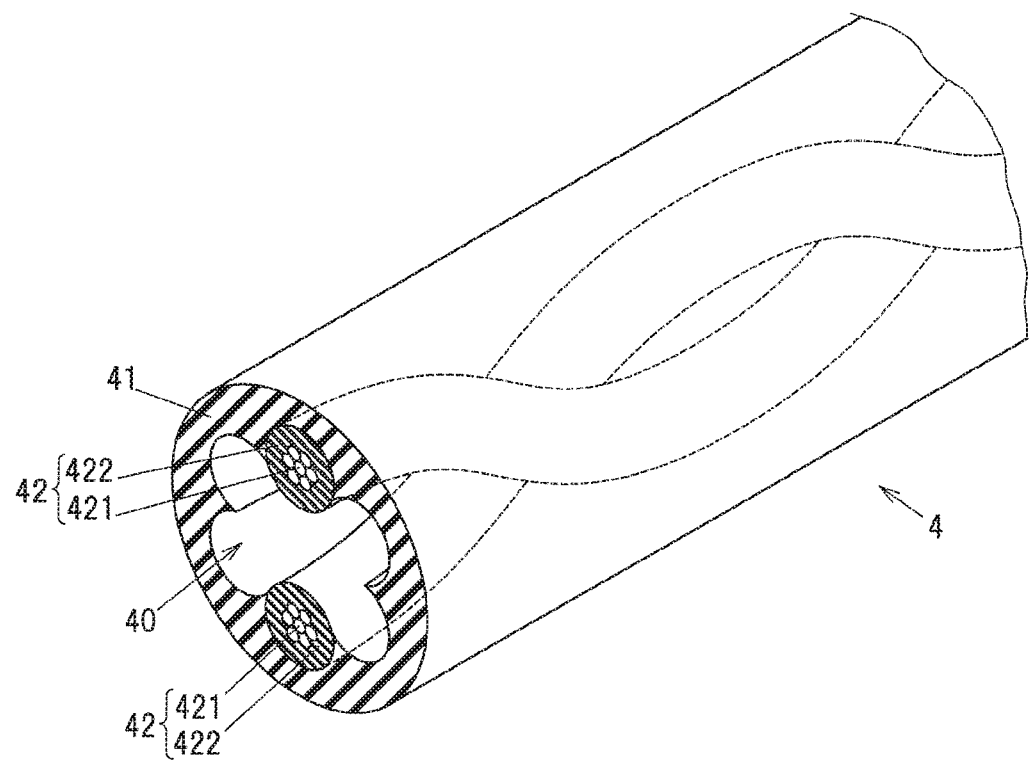
FIG. 3A is a perspective view showing a linear shape pressure sensing member.
Figure 3B:
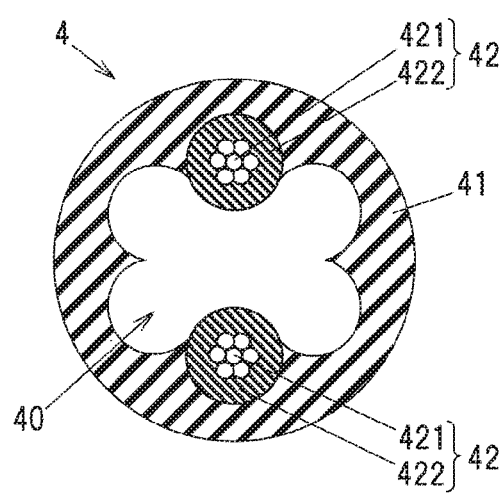
FIG. 3B is a cross-sectional view of the linear shape pressure sensing member in a natural condition when acted on by no external force.
Figure 3C:
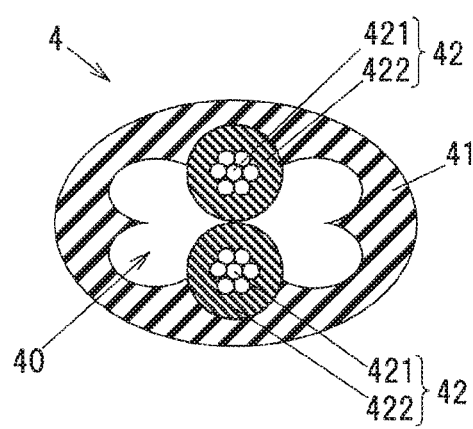
FIG. 3C is a cross-sectional view of the linear shape pressure sensing member in a compressed condition when acted on by an external force.

FIG. 3A is a perspective view showing the linear shape pressure sensing member 4. FIG. 3B is a cross-sectional view of the linear shape pressure sensing member 4 in a natural condition when acted on by no external force. FIG. 3C is a cross-sectional view of the linear shape pressure sensing member 4 in a compressed condition when acted on by an external force.

The linear shape pressure sensing member 4 includes a tube 41 which is formed of a tubular elastic body, and a plurality of conductor wires 42 which are spaced apart from each other in an inner side of that tube 41. More specifically, two conductor wires 42 are being helically held on an inner surface of the tube 41 while being partially exposed, with a space 40 being formed in a central portion of the tube 41. The tube 41 is made of, e.g., an insulating rubber material such as silicone rubber or ethylene propylene rubber, and has such elasticity as to be deformed by being acted on by an external force, and restored immediately no external force is exerted.

In a natural condition of the tube 41 when acted on by no external force, the plurality of conductor wires 42 are being held in non-contact with each other with the space 40 therebetween. Further, the tube 41 when acted on by an external force is elastically deformed to bring the plurality of conductor wires 42 into contact with each other. In each of the conductor wires 42, a metal stranded wire 421 with multiple metal wires stranded together is being covered with a conductive covering layer 422. This structure allows the linear shape pressure sensing member 4 to sense external pressure forces in all radial directions of the tube 41.

Figure 4:
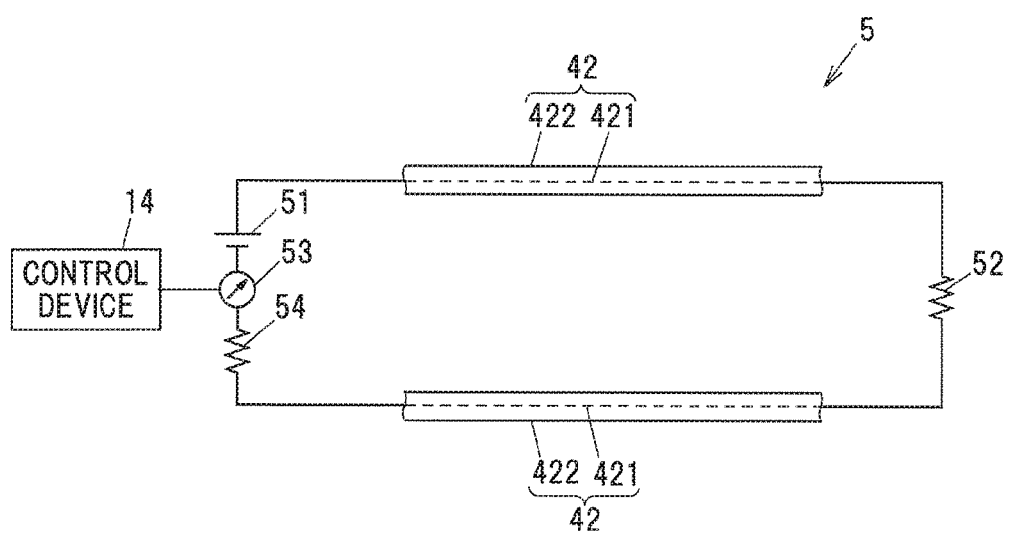
FIG. 4 is a circuit diagram showing one example of an electric circuit for detecting the occurrence of pinch in the sliding doors with the linear shape pressure sensing member.

FIG. 4 is a circuit diagram showing one example of an electric circuit 5 for detecting the occurrence of pinch in the sliding door 11 with the linear shape pressure sensing member 4. The electric circuit 5 is being configured to include the two conductor wires 42 of the linear shape pressure sensing member 4, and includes a power source 51, a contact detection resistor 52 that connects together end portions of the two conductor wires 42, an ammeter 53 and a current limitation resistor 54 that are connected in series with the power supply 51. The ammeter 53 includes, for example, a current sensor such as a Hall IC and an amplifier, and its detection signal is output to the control device 14.

In the electric circuit 5 configured as described above, when the linear shape pressure sensing member 4 is compressed and the conductor wires 42 are brought into contact with each other, electric current to be detected by the ammeter 53 varies. The control device 14 recognizes the occurrence of pinch in the sliding door 11 from the variation of the detection signal of the ammeter 53, and stops or reverses the driving device 13.

Note that although in FIG. 4 the electric circuit 5 is shown for only one linear shape pressure sensing member 4, since in the present embodiment, the pinch detection sensor 2 has the three linear shape pressure sensing members 4, each of the linear shape pressure sensing members 4 is being provided with its each electric circuit 5, and the detection signals of the ammeters 53 of their respective electric circuits 5 are output to the control device 14. The control device 14 when recognizing the occurrence of compression of any of the linear shape pressure sensing members 4 stops or reverses the driving device 13.

In the present embodiment, in order to enable secure detection of occurrence of pinch even when acted on by an external force at oblique angles to the moving direction of the sliding door 11 during closing of the sliding door 11, the plurality of linear shape pressure sensing members 4 are being arranged at locations different from each other in the passenger entry and exit directions. That is, the plurality of linear shape pressure sensing members 4 are being arranged in such a manner as to be aligned in a direction which intersects the moving directions of the sliding doors 11 and 11 and the longitudinal direction (vertical direction) of the door front edge rubber 3, and be not overlapped in the moving directions of the sliding doors 11 and 11. Hereinafter, the direction which intersects the moving directions of the sliding doors 11 and 11 and the longitudinal direction of the door front edge rubber 3 is referred to as the alignment direction.

More specifically, of the three linear shape pressure sensing members 4, one linear shape pressure sensing member 4 accommodated in the first housing space 301 is disposed in the middle portion in the alignment direction in the hollow portion 30, while the other two linear shape pressure sensing members 4 are disposed on one side (vehicle exterior side) and the other side (vehicle interior side), respectively, in the alignment direction of the one linear shape pressure sensing member 4 accommodated in the first housing space 301. The linear shape pressure sensing member 4 disposed on one side is being accommodated in the second housing space 302, while the linear shape pressure sensing member 4 disposed on the other side is being accommodated in the third housing space 303.

The lengths of the first to third housing spaces 301 to 303 in a width direction of the sliding door 11 in the movement direction of the sliding door 11 are greater than the diameters of the linear shape pressure sensing members 4, thereby allowing the linear shape pressure sensing member 4 accommodated in the first housing space 301 to be moved in the width direction of the sliding door 11 within the first housing space 301, the linear shape pressure sensing member 4 accommodated in the second housing space 302 to be moved in the width direction of the sliding door 11 within the second housing space 302, and the linear shape pressure sensing member 4 accommodated in the third housing space 303 to be moved in the width direction of the sliding door 11 within the third housing space 303.

With this door front edge rubber 3 structure, even when a part of the passenger 8 body is pinched between the sliding doors 11 and 11 during closing of the sliding doors 11 and 11, pain felt by the passenger 8 is mitigated by the cushionability of the door front edge rubber 3 enhanced by the spaces of the first to third housing spaces 301 to 303. In particular, the first housing space 301 located in the middle portion in the alignment direction is longer in length in the width direction of the sliding door 11 than the second and third housing spaces 302 and 303, so that the impact when the tip of the cover section 32 collides with the passenger 8 is greatly relaxed. In the present embodiment, the length of the first housing space 301 in the width direction of the sliding door 11 is twice or more the diameter of the linear shape pressure sensing members 4.

Figure 5:
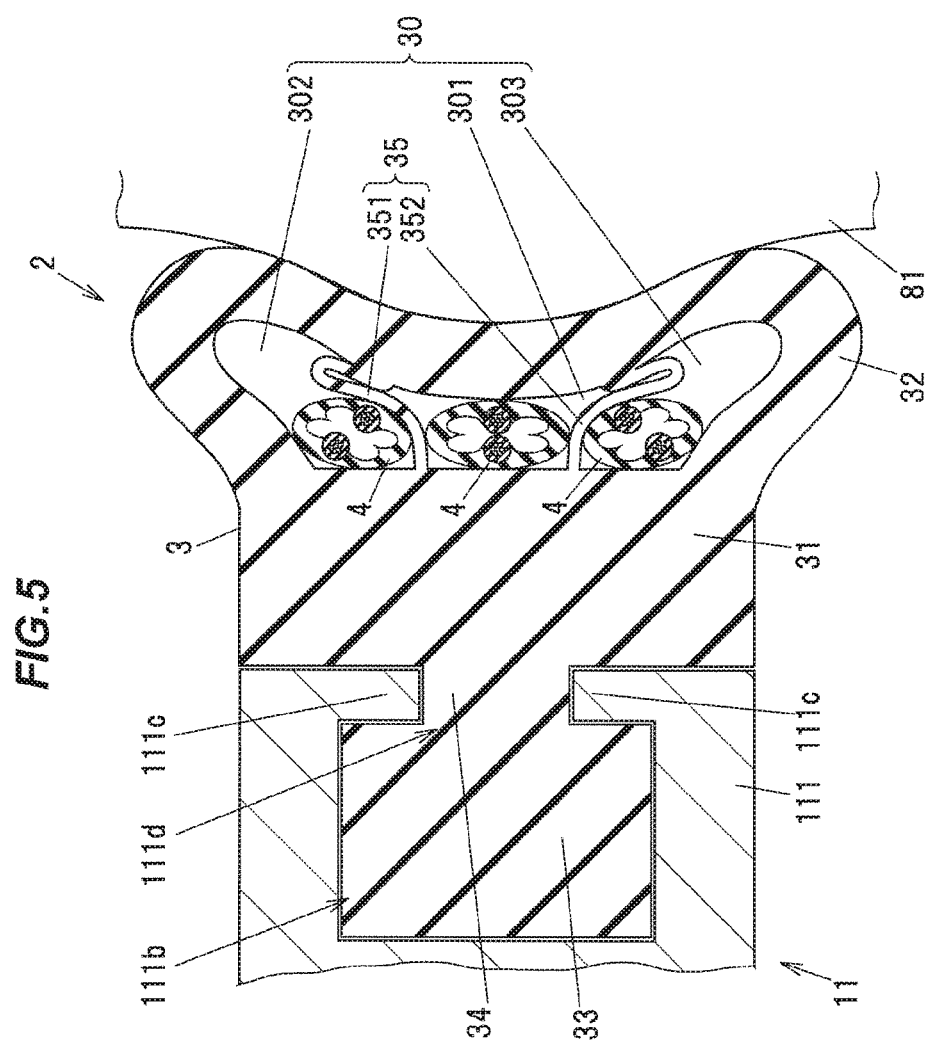
FIG. 5 is an explanatory view showing a tip in a door closing direction of a cover section of a door front edge rubber when colliding with a part of a passenger's body.

FIG. 5 shows the compressed linear shape pressure sensing member 4 accommodated in the first housing space 301 when the tip of the cover section 32 of the door front edge rubber 3 in the closing direction of the sliding door 11 collides with a part 81 of the passenger 8 body during closing of the sliding door 11. The linear shape pressure sensing member 4 accommodated in the first housing space 301 is being sandwiched between the cover section 32 and the base section 31, with the tube 41 being elastically deformed, with the two conductor wires 42 being brought into contact with each other.

Figure 6:
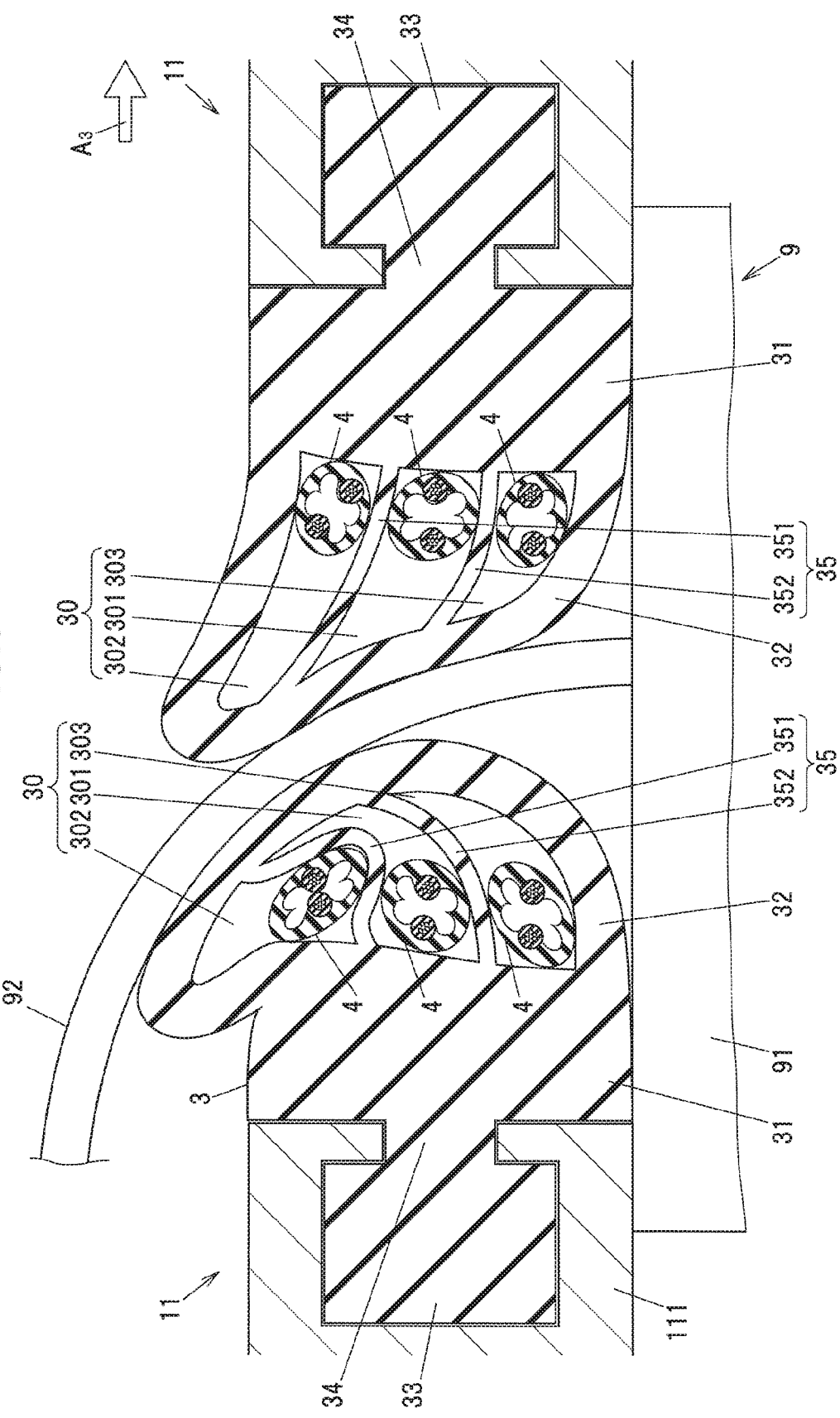
FIG. 6 is an explanatory view showing a train vehicle departing with a string-like object of belongings of a passenger having exited to the vehicle exterior remaining pinched between the left and right sliding doors of that vehicle, with a main body object of their belongings being left behind in the vehicle interior.

FIG. 6 shows the train vehicle 1 departing in its forward movement direction indicated by arrow $A_3$ with the string-like object 92 of the belongings 9 of the passenger 8 having exited to the vehicle exterior remaining pinched between the left and right sliding doors 11 and 11 of that vehicle 1, with the main body object 91 of their belongings 9 being left behind in the vehicle interior.

In this condition, the linear shape pressure sensing member 4 accommodated in the second housing space 302 of the pinch detection sensor 2 attached to the rear sliding door 11 in the vehicle forward movement direction of the left and right sliding doors 11 is compressed, with its two conductor wires 42 being brought into contact with each other. This results in detection of the occurrence of pinch. That is, with the pinch detection sensors 2 according to the present embodiment, even when the string-like object 92 has such a thickness dimension that the occurrence of pinch is not detected only by it being pinched between the left and right sliding doors 11 and 11, it is possible to detect the occurrence of pinch by that linear shape pressure sensing member 4 being acted on by the external force at the oblique angle to the closing direction of the sliding door 11 as shown in FIG. 6.

Note that although not shown, when the train vehicle 1 departs with the string-like object 92 remaining pinched between the left and right sliding doors 11 and 11, the cover section 32 of the door front edge rubber 3 may be pulled to the vehicle exterior side, to compress the linear shape pressure sensing member 4 accommodated in the third housing space 303, and bring its two conductor wires 42 into contact with each other. Further, the linear shape pressure sensing member 4 accommodated in the third housing space 303 can also be compressed when the passenger 8 collides with the door front edge rubber 3 by exiting from the vehicle interior side to the vehicle exterior side during closing of the sliding doors 11 and 11. Similarly, the linear shape pressure sensing member 4 accommodated in the second housing space 302 can also be compressed when the passenger 8 collides with the door front edge rubber 3 by entering the vehicle interior side from the vehicle exterior side during closing of the sliding doors 11 and 11.

When the occurrence of pinch is detected with the pinch detection sensors 2 after departure of the train vehicle 1, the train vehicle 1 is promptly stopped by the manual operation of the driver having received the alarm, or automatically in the case of automatic running, to open the sliding doors 11 and 11.

(Advantageous Effects of the First Embodiment)

According to the first embodiment described above, the following operations and advantageous effects (1) to (3) can be obtained.

(1) Since the hollow portion 30 is partitioned by the partitioning portion 35 into the first to third housing spaces 301 to 303, the movements of the plurality of linear shape pressure sensing members 4 within the hollow portion 30 of the door front edge rubber 3 are restricted, to be able to fix the plurality of linear shape pressure sensing members 4 at such locations, respectively, that the plurality of linear shape pressure sensing members 4 are acted on by external forces in various directions. This makes it possible to detect the occurrence of pinch, even when the plurality of linear shape pressure sensing members 4 are acted on by external forces at oblique angles to the movement direction of the sliding door 11 during closing of the sliding door 11.

(2) Since the plurality of linear shape pressure sensing members 4 are not overlapped in the moving direction of the sliding door 11 and are being arranged at locations different from each other in the alignment direction, the angle range in which the pressure can be detected by the pinch detection sensors 2 is wide. Further, in the present embodiment, since the occurrence of pinch in the closing direction of the sliding door 11 which occurs with high frequency is detected by one linear shape pressure sensing member 4 disposed in the middle portion in the alignment direction, while the occurrence of pinch at oblique angles to the closing directions of the sliding doors 11 is detected by the other two linear shape pressure sensing members 4, it is possible to securely detect various types of occurrence of pinch.

(3) Since the first to third housing spaces 301, 302, and 303 are partitioned with no gap therebetween by the partitioning portion 35, the plurality of linear shape pressure sensing members 4 can appropriately be disposed without being moved between the first to third housing spaces 301, 302, and 303, regardless of how the door front edge rubber 3 is deformed.

Second Embodiment

Figure 7:
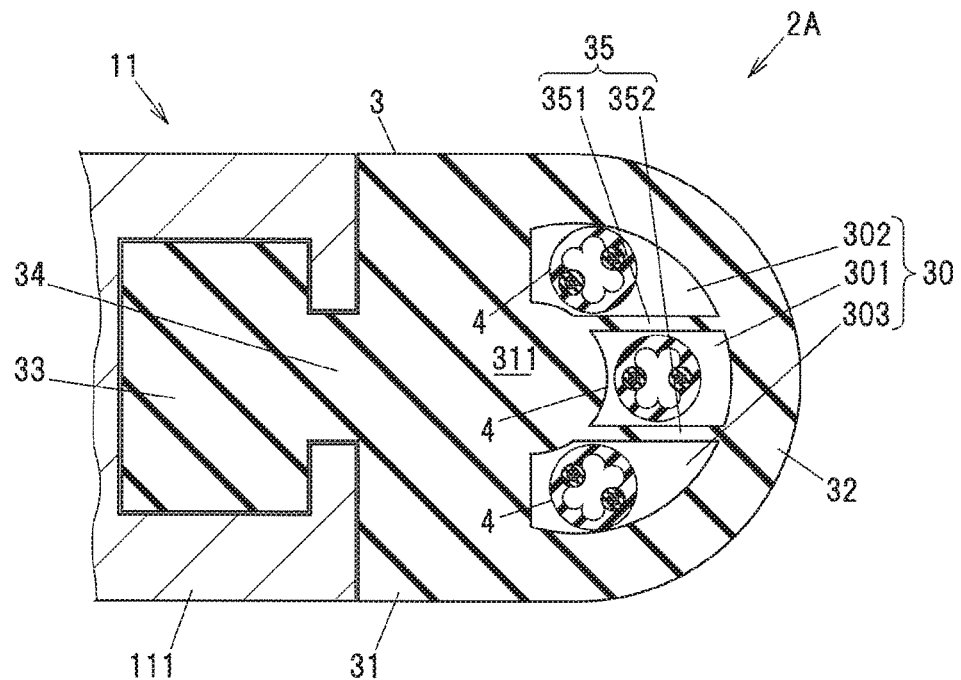
FIG. 7 is a cross-sectional view showing a pinch detection sensor according to a second embodiment.

Next, a second embodiment of the present invention will be described with reference to FIG. 7. FIG. 7 is a cross-sectional view showing a pinch detection sensor 2A according to the second embodiment. In the present embodiment, the base section 31 of the door front edge rubber 3 has a semicircular protrusion 311 which protrudes in a door closing direction (to the cover section 32 side) in the middle portion in the alignment direction. This protrusion 311 is being formed across the first to third housing spaces 301 to 303, and is most protruding toward the first housing space 301.

According to the pinch detection sensor 2A according to the above second embodiment, since the length of the first housing space 301 is shorter than that of the first embodiment, even when the amount of deformation of the cover section 32 is small, the two conductor wires 42 of the linear shape pressure sensing member 4 accommodated in the first housing space 301 are brought into contact with each other, so even when the external force is relatively small, it is possible to detect the occurrence of pinch. Further, when acted on by external force at an oblique angle to the closing direction of the sliding door 11, the linear shape pressure sensing members 4 accommodated in the second housing space 302 or the third housing space 303 are pressed against the protrusion 311, to bring their two conductor wires 42 into contact with each other, therefore making it possible to also detect the occurrence of pinch which causes the relatively small external force at that oblique angle to the door closing direction.

Third Embodiment

Figure 8:
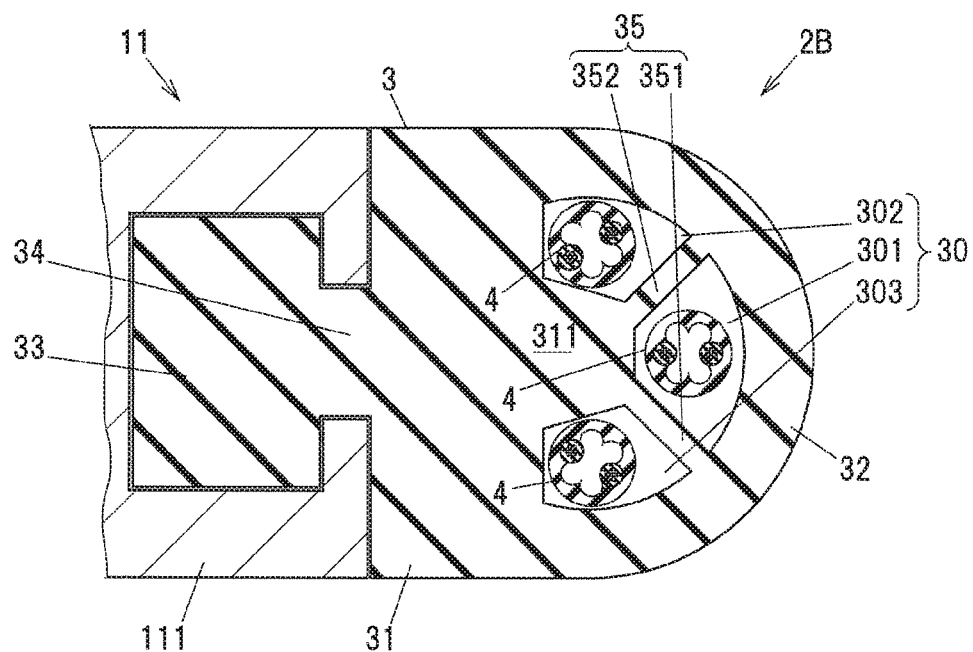
FIG. 8 is a cross-sectional view showing a pinch detection sensor according to a third embodiment.

FIG. 8 is a cross-sectional view showing a pinch detection sensors 2B according to a third embodiment. As with the detection switch 2A according to the second embodiment, the detection switch 2B is being provided with a protrusion 311 in the base section 31 which protrudes in the door closing direction in the middle portion in the alignment direction, but unlike that of the second embodiment, that protrusion 311 in the third embodiment is being formed into a trapezoidal shape. The protrusion 311 becomes wider in width in the alignment direction with increasing distance from the top surface of the first housing space 301, so the distance between both side surfaces of the second and third housing spaces 302 and 303 becomes longer. Further, in the pinch detection sensor 2B, the first wall section 351 and the second wall section 352 are extending from the corners between the top surface and both the side surfaces of the protrusion 311, and at such oblique angles as to be separated from each other with respect to the moving direction of the sliding door 11.

With this third embodiment, as in the second embodiment, it is also possible to detect even the occurrence of pinch which causes the relatively small external force.

Fourth Embodiment

Next, a fourth embodiment of the present invention will be described with reference to FIG. 9.

Figure 9:
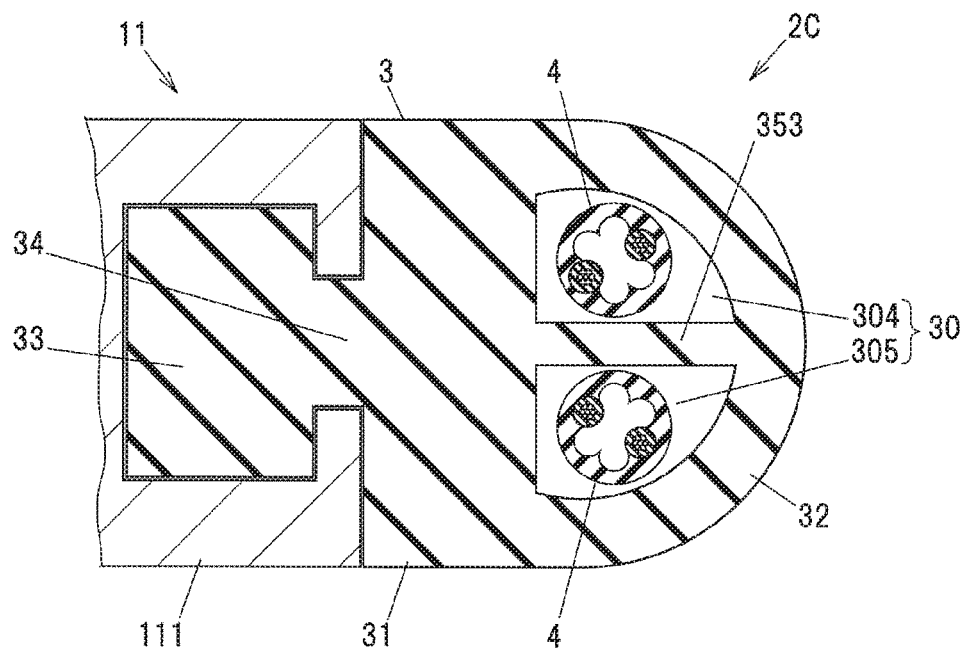
FIG. 9 is a cross-sectional view showing a pinch detection sensor according to a fourth embodiment.

FIG. 9 is a cross-sectional view showing a pinch detection sensor 2C according to a fourth embodiment. Although in the first to third embodiments, it has been described that the hollow portion 30 of the door front edge rubber 3 is partitioned into three housing spaces, the hollow portion 30 in the pinch detection sensor 2C according to the present embodiment is partitioned into two housing spaces. More specifically, the hollow portion 30 is partitioned into a first housing space 304 and a second housing space 305 by a single wall-like partitioning portion 353, and respective one linear shape pressure sensing members 4 are being accommodated in the first housing space 304 and the second housing space 305.

With the present embodiment, it is also possible to detect the occurrence of pinch which causes an external force at an oblique angle to the moving direction of the sliding door 11 during closing of the sliding door 11. Further, since the number of linear shape pressure sensing members 4 can be reduced, cost lowering can be ensured, as compared with the first to third embodiments.

Fifth Embodiment

Figure 10:
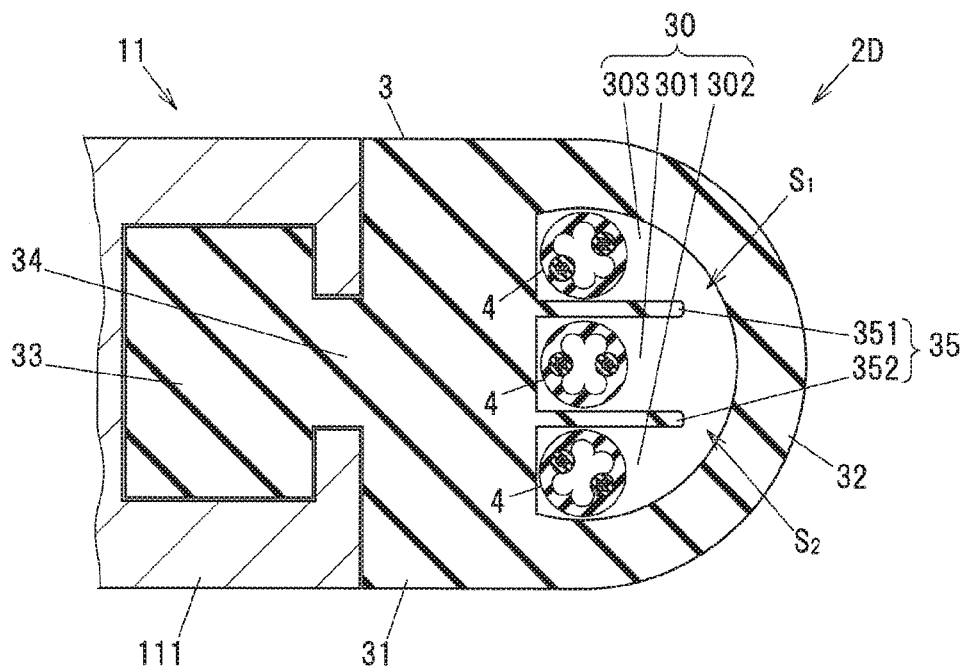
FIG. 10 is a cross-sectional view showing a pinch detection sensor according to a fifth embodiment.

Next, a fifth embodiment of the present invention will be described with reference to FIG. 10. FIG. 10 is a cross-sectional view showing a pinch detection sensor 2D according to the fifth embodiment. Although in the first to fourth embodiments, it has been described that the first to third housing spaces 301 to 303 are partitioned with no gap therebetween by the partitioning portion 35, the first to third housing spaces 301 to 303 in the pinch detection sensor 2D according to the present embodiment are being configured in communication via gaps $S_1$ and $S_2$. The sizes of the gaps $S_1$ and $S_2$ are narrower than the diameters of the linear shape pressure sensing members 4, so the movements of the linear shape pressure sensing members 4 between the first to third housing spaces 301 to 303 are restricted by the partition part 35 in the same manner as in each of the above embodiments.

With the fifth embodiment, it is also possible to fix the plurality of linear shape pressure sensing members 4 at such locations, respectively, that the plurality of linear shape pressure sensing members 4 are acted on by external forces in various directions, and it is possible to simplify the configuration of dies used for extrusion molding of the door front edge rubber 3, and facilitate production of the door front edge rubber 3.

Sixth Embodiment

Figure 11:
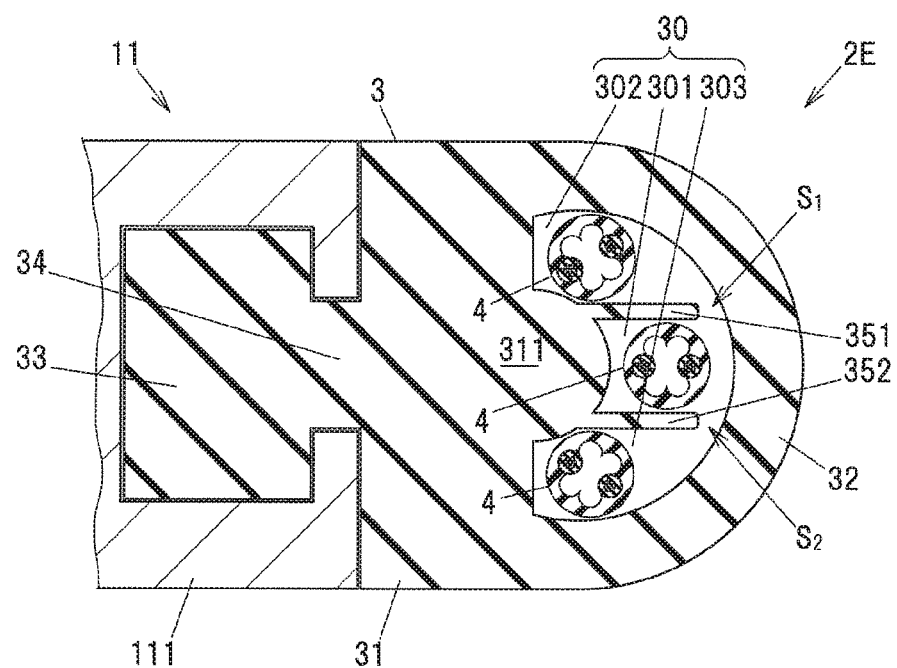
FIG. 11 is a cross sectional view showing a pinch detection sensor according to a sixth embodiment.

Next, a sixth embodiment of the present invention will be described with reference to FIG. 11. FIG. 11 is a cross-sectional view showing a pinch detection sensor 2E according to the sixth embodiment of the present invention. This pinch detection sensor 2E is provided with a protrusion 311 in the base section 31 of the door front edge rubber 3 of the pinch detection sensor 2D according to the fifth embodiment, in the same manner as in the second embodiment.

With the sixth embodiment, in addition to the advantageous effects of the fifth embodiment, as with the second embodiment, it is possible to detect the occurrence of pinch which causes the relatively small external force.

Seventh Embodiment

Figure 12:
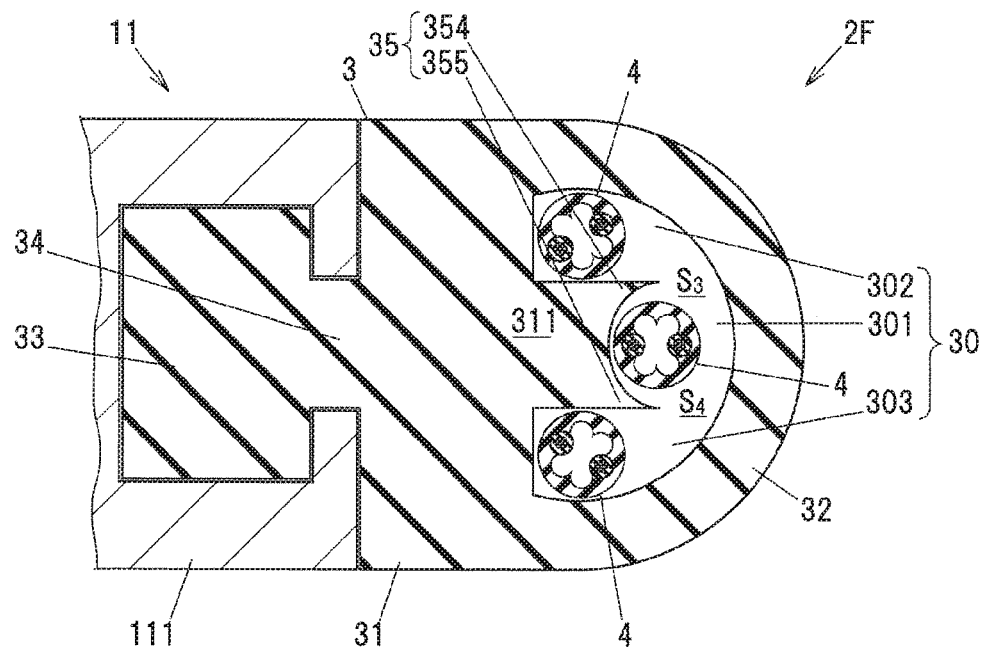
FIG. 12 is a cross-sectional view showing a pinch detection sensor according to a seventh embodiment.

Next, a seventh embodiment of the present invention will be described with reference to FIG. 12. FIG. 12 is a cross-sectional view showing a pinch detection sensor 2F according to the seventh embodiment. The pinch detection sensor 2F is being provided with a protrusion 311 in the base section 31 of the door front edge rubber 3, and a partitioning portion 35 is being provided on a tip of that protrusion 311. The partitioning portion 35 is being formed with an arc-shaped surface opposite the cover section 32, which is greater in curvature than the outer circumferential surfaces of the linear shape pressure sensing members 4, and includes first and second protruding corner sections 354 and 355 in both end portions in the alignment direction. Gaps $S_3$ and $S_4$ are being formed between the first and second protruding corner sections 354 and 355, respectively, and the cover section 32. The sizes of the gaps $S_3$ and $S_4$ are narrower than the diameters of the linear shape pressure sensing members 4, so the movements of the linear shape pressure sensing members 4 between the first to third housing spaces 301 to 303 are restricted.

According to the seventh embodiment, it is possible to detect with the protrusion 311 the occurrence of pinch which causes a relatively small external force, and since the first to third housing spaces 301 to 303 are being configured in communication with each other via the gaps $S_3$ and $S_4$, the production of the door front edge rubber 3 is facilitated.

Eighth Embodiment

Figure 13:
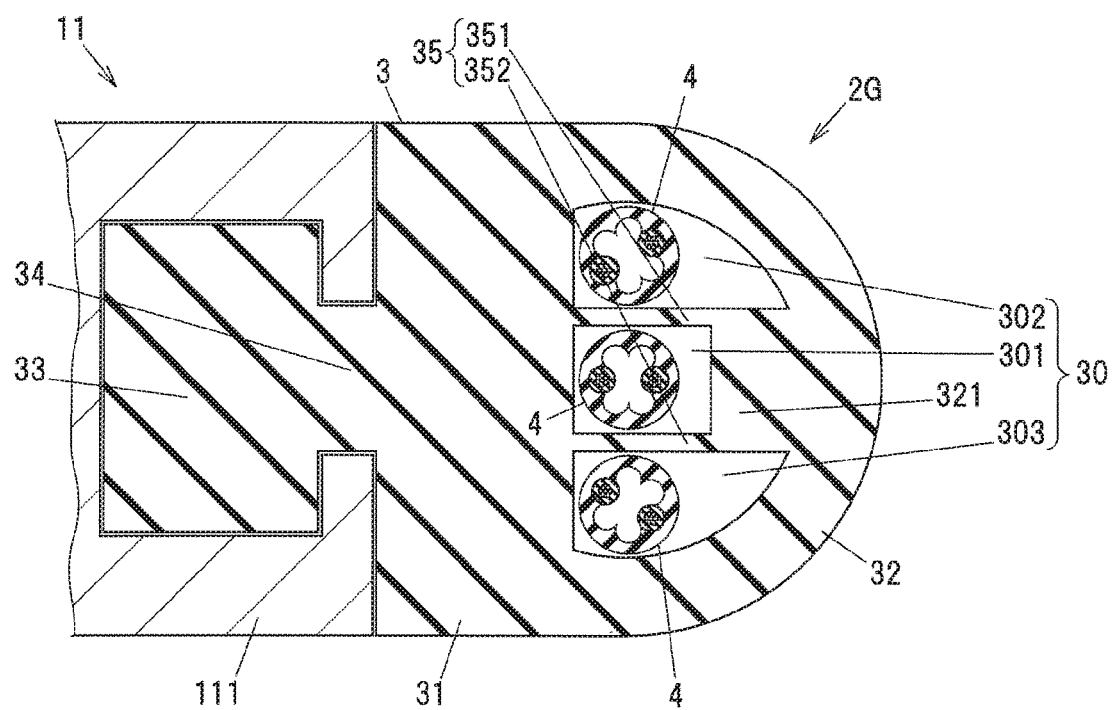
FIG. 13 is a cross-sectional view showing a pinch detection sensor according to an eighth embodiment.

Next, an eighth embodiment of the present invention will be described with reference to FIG. 13. FIG. 13 is a cross-sectional view showing a pinch detection sensor 2G according to the eighth embodiment. In the pinch detection sensor 2G, the cover section 32 of the door front edge rubber 3 has an inward protrusion 321 which protrudes toward the base section 31 and to the one linear shape pressure sensing member 4 accommodated in the first housing space 301. The first wall section 351 that partitions the first housing space 301 and the second housing space 302, and the second wall section 352 that partitions the first housing space 301 and the third housing space 303 are being provided between the base section 31 and the inward protrusion 321 of the cover section 32.

According to the eighth embodiment, even when the amount of deformation of the cover section 32 is small as compared to the first embodiment, the two conductor wires 42 of the linear shape pressure sensing member 4 accommodated in the first housing space 301 are brought into contact with each other, so even when the external force is relatively small, it is possible to detect the occurrence of pinch in the closing direction of the sliding door 11.

Ninth Embodiment

Figure 14:
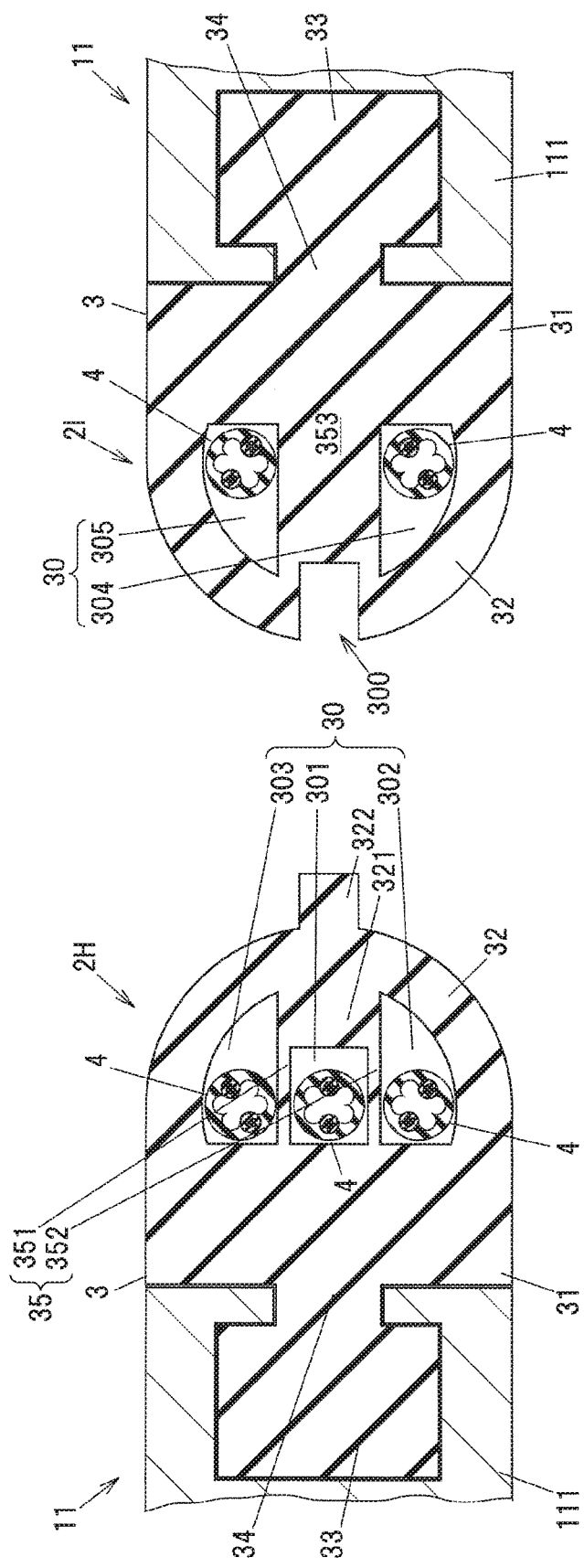
FIG. 14 is a cross-sectional view showing a pinch detection sensor according to a ninth embodiment.

Next, a ninth embodiment of the present invention will be described with reference to FIG. 14. Although the first to eighth embodiments have been described on the condition that the pinch detection sensors having the same structures are used for the left and right sliding doors 11 and 11, the pinch detection sensor attached to one of the left and right sliding doors 11 and 11 and the pinch detection sensor attached to the other sliding door 11 in the present embodiment are different in structure. Hereinafter, the pinch detection sensor attached to one sliding door 11 will be referred to as one pinch detection sensor 2H, while the pinch detection sensor attached to the other sliding door 11 will be referred to as the other pinch detection sensor 2I.

The one pinch detection sensor 2H is further provided with an outward protrusion 322 in the cover section 32 of the pinch detection sensor 2G according to the eighth embodiment. The outward protrusion 232 is protruding from the middle portion in the alignment direction of the cover sections 32 toward the other pinch detection sensor 2I and to the opposite side to the hollow portion 30.

The other pinch detection sensor 2I is configured as a modification to the pinch detection sensor 2C according to the fourth embodiment, and is being provided with a mating recessed portion 300 in the middle portion in the alignment direction of the cover section 32, which is mated with the outward protrusion 322 of the one pinch detection sensor 2H. The mating recessed portion 300 is being formed in a range from the cover section 32 to the partitioning portion 353. Note that in the door front edge rubber 3 of the other pinch detection sensor 2I, the thickness in the alignment direction of the partitioning portion 353 that partitions the hollow portion 30 into the first housing space 304 and the second housing space 305 is being formed thicker at least in the end portion in the closing direction than the width in the alignment direction of the mating recessed portion 300.

According to the ninth embodiment, when the passenger 8 or their belongings 9 are pinched between the left and right sliding doors 11 and 11, the pressure due to that pinch is easily transmitted from the outward protrusion 322 of the one pinch detection sensor 2H to the linear shape pressure sensing member 4 accommodated in the first housing space 301, so it is possible to securely detect the occurrence of that pinch. In addition, by the outward protrusion 322 of the one pinch detection sensor 2H being mated to the mating recessed portion 300 of the other pinch detection sensor 2I, the airtightness of the interior of the train vehicle 1 is enhanced and besides, the occurrence of rattling of the sliding doors 11 and 11 is suppressed.

SUMMARY OF THE EMBODIMENTS

Next, the technical ideas grasped from the above-described embodiments will be described with the aid of the reference characters and the like in the embodiments. It should be noted, however, that each of the reference characters in the following descriptions is not to be construed as limiting the constituent elements in the claims to the members and the like specifically shown in the embodiments.

[1] A pinch detection sensor (2, 2A to 2H), for detecting the occurrence of pinch during closing of a sliding door (11), comprising: a door front edge rubber (3) including a hollow portion (30) inside, to be attached to a front edge portion of the sliding door (11) in a closing movement direction ($A_2$) of the sliding door (11); and a plurality of linear shape pressure sensing members (4) accommodated in the hollow portion (30), each linear shape pressure sensing member (4) comprising a tubular elastic body (tube 41) and respective conductor wires (42) spaced apart from each other in an inner side of the tubular elastic body (tube 41); wherein the door front edge rubber (3) includes, in the hollow portion (30), a plurality of housing spaces (301 to 303), which accommodate the plurality of linear shape pressure sensing members (4), respectively, wherein movements of the linear shape pressure sensing members (4) between the plurality of housing spaces (301 to 303) are restricted by a partitioning portion (35).

[2] The pinch detection sensor (2, 2A to 2H) according to [1] above, wherein the plurality of linear shape pressure sensing members (4) are being arranged in such a manner as to be aligned in an alignment direction ($A_1$) which intersects a moving direction of the sliding door (11) and a longitudinal direction of the door front edge rubber (3), and be not overlapped in the moving direction of the sliding door (11).

[3] The pinch detection sensor (2, 2A, 2B, 2D to 2H) according to [2] above, further including three of the linear shape pressure sensing members (4), wherein one of the three linear shape pressure sensing members (4) is disposed in a middle portion in the alignment direction ($A_1$) in the hollow portion (30), while other two of the three linear shape pressure sensing members (4) are disposed on one side and an other side, respectively, in the alignment direction ($A_1$) of the one linear shape pressure sensing member (4).

[4] The pinch detection sensor (2A, 2B, 2E, 2F) according to [2] or [3] above, wherein the door front edge rubber (3) integrally includes a cover section (32) that covers the plurality of linear shape pressure sensing members (4) in the closing movement direction ($A_2$) relative to the hollow portion (30), and a base section (31) that forms the hollow portion (30) between it and the cover section (32), wherein the cover section (32) is curved in an arch shape protruding in the closing movement direction ($A_2$) in a middle portion in the alignment direction ($A_1$), wherein the base section (31) includes a protrusion (311) that protrudes in the closing movement direction ($A_2$) in a middle portion in the alignment direction ($A_1$).

[5] The pinch detection sensor (2G) according to the above [3], wherein the door front edge rubber (3) integrally includes a cover section (32) that covers the plurality of linear shape pressure sensing members (4) in the closing movement direction ($A_2$) relative to the hollow portion (30), and a base section (31) that forms the hollow portion (30) between it and the cover section (32), wherein the cover section (32) is curved in an arch shape protruding in the closing movement direction (A2) in a middle portion in the alignment direction ($A_1$), and includes an inward protrusion (321) that protrudes toward the base section (31) and to the one linear shape pressure sensing member (4).

[6] The pinch detection sensor (2H) according to [3] above, wherein the door front edge rubber (3) integrally includes a cover section (32) that covers the plurality of linear shape pressure sensing members (4) in the closing movement direction ($A_2$) relative to the hollow portion (30), and a base section (31) that forms the hollow portion (30) between it and the cover section (32), wherein the cover section (32) is curved in an arch shape protruding in the closing movement direction ($A_2$) in a middle portion in the alignment direction ($A_1$), and includes an outward protrusion (322) that protrudes on the opposite side of the cover section (32) to the hollow portion (30).

[7] The pinch detection sensor (2, 2A to 2C, 2G) according to the above [1] to [6], wherein the plurality of housing spaces (301 to 303) are partitioned with no gap therebetween by the partitioning portion (35).

Although the embodiments of the present invention have been described above, the above described embodiments are not to be construed as limiting the inventions according to the claims. It should also be noted that not all combinations of the features described in the embodiments are indispensable to the means for solving the problem of the invention.

Further, the present invention can appropriately be modified and implemented without departing from the spirit thereof. For example, although in the above described embodiments, there has been described the case where the present invention is applied to the sliding doors 11 for opening and closing the doorway 10 of the train vehicle 1, the present invention is not limited thereto, but may also be applied to, for example so-called home door sliding doors which are provided on the platform 7 and which are opened after arrival of the train vehicle 1 and closed before departure of the train vehicle 1.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A pinch detection sensor, for detecting an occurrence of a pinch during closing of a sliding door, comprising:
   a door front edge rubber member including a hollow portion inside, to be attached to a front edge portion of the sliding door in a closing movement direction of the sliding door; and
   a plurality of linear shape pressure sensing members accommodated in the hollow portion, each linear shape pressure sensing member comprising a tubular elastic body and respective conductor wires spaced apart from each other in an inner side of the tubular elastic body;
   wherein the door front edge rubber member includes, in the hollow portion, a plurality of housing spaces, which accommodate the plurality of linear shape pressure sensing members, respectively,
   wherein each linear shape pressure sensing member accommodated in its respective housing space is allowed to be moved in a width direction of the sliding door within the housing space, and
   wherein movements of the linear shape pressure sensing members between the plurality of housing spaces are restricted by a partitioning portion, wherein the plurality of linear shape pressure sensing members are aligned in an alignment direction which intersects the closing moving direction of the sliding door and a longitudinal direction of the door front edge rubber member, and are not overlapped in the closing moving direction of the sliding door.

2. The pinch detection sensor according to claim 1, further including three of the linear shape pressure sensing members,
   wherein one of the three linear shape pressure sensing members is disposed in a middle portion of the hollow portion, in the alignment direction,
   wherein one of an other two of the three linear shape pressure sensing members is disposed on one side of the one linear shape pressure sensing member disposed in the middle Portion of the hollow Portion in the alignment direction, and
   wherein an other one of the other two of the three linear shape pressure sensing members is disposed on an other side of the one linear shape pressure sensing member disposed in the middle portion of the hollow portion in the alignment direction.

3. The pinch detection sensor according to claim 1, wherein the door front edge rubber member integrally includes a cover section that covers the plurality of linear shape pressure sensing members in the closing movement direction relative to the hollow portion, and a base section that forms the hollow portion between the base section and the cover section,
  wherein the cover section is curved in an arch shape protruding in the closing movement direction in a middle portion of the cover section, in the alignment direction, and
  wherein the base section includes a protrusion that protrudes in the closing movement direction in a middle portion of the base section, in the alignment direction.

4. The pinch detection sensor according to claim 2, wherein the door front edge rubber member integrally includes a cover section that covers the plurality of linear shape pressure sensing members in the closing movement direction relative to the hollow portion, and a base section that forms the hollow portion between the base section and the cover section,
  wherein the cover section is curved in an arch shape protruding in the closing movement direction in a middle portion of the cover section, in the alignment direction, and
  wherein the base section includes a protrusion that protrudes in the closing movement direction in a middle portion of the base section, in the alignment direction.

5. The pinch detection sensor according to claim 2, wherein the door front edge rubber member integrally includes a cover section that covers the plurality of linear shape pressure sensing members in the closing movement direction relative to the hollow portion, and a base section that forms the hollow portion between the base section and the cover section, and
  wherein the cover section is curved in an arch shape protruding in the closing movement direction in a middle portion of the cover section in the alignment direction, and includes an inward protrusion that protrudes toward the base section and to the one linear shape pressure sensing member disposed in the middle portion of the hollow portion, in the alignment direction.

6. The pinch detection sensor according to claim 2, wherein the door front edge rubber member integrally includes a cover section that covers the plurality of linear shape pressure sensing members in the closing movement direction relative to the hollow portion, and a base section that forms the hollow portion between the base section and the cover section, and
  wherein the cover section is curved in an arch shape protruding in the closing movement direction in a middle portion of the cover section, in the alignment direction, and includes an outward protrusion that protrudes on an opposite side of the cover section to the hollow portion.

7. The pinch detection sensor according to claim 1, wherein the plurality of housing spaces are partitioned with no gap therebetween by the partitioning portion.

8. The pinch detection sensor according to claim 1, wherein each linear shape pressure sensing member of the plurality of linear shape pressure sensing members are accommodated in each housing space of the plurality of housing spaces, respectively, and each linear shape pressure sensing member is movable within the respective housing space.

9. The pinch detection sensor according to claim 1, wherein each linear shape pressure sensing member of the plurality of linear shape pressure sensing members are accommodated in each housing space of the plurality of housing spaces, respectively, and each linear shape pressure sensing member is movable in a width direction of the sliding door within each housing space of the plurality of housing spaces.

10. The pinch detection sensor according to claim 1, wherein a direction which intersects a moving direction of the sliding door and a longitudinal direction of the door front edge rubber member comprises the alignment direction.

11. The pinch detection sensor according to claim 3, wherein the cover section includes an outward protrusion that protrudes on an interior side of the cover section to the hollow portion.

12. The pinch detection sensor according to claim 4, wherein the cover section includes an outward protrusion that protrudes on an interior side of the cover section to the hollow portion.

13. The pinch detection sensor according to claim 5, wherein the cover section includes an outward protrusion that protrudes on an interior side of the cover section to the hollow portion.

14. A pinch detection sensor, for detecting an occurrence of a pinch during closing of a sliding door, comprising:
  a door front edge rubber member including a hollow portion inside, to be attached to a front edge portion of the sliding door in a closing movement direction of the sliding door; and
  a plurality of linear shape pressure sensing members accommodated in the hollow portion, each linear shape pressure sensing member comprising a tubular elastic body and respective conductor wires spaced apart from each other in an inner side of the tubular elastic body;
  wherein the door front edge rubber member includes, in the hollow portion, a plurality of housing spaces, which accommodate the plurality of linear shape pressure sensing members, respectively,
  wherein a length of each housing space of the plurality of housing spaces, in the width direction of the sliding door, in the closing movement direction of the sliding door, is greater than the diameter of each linear shape pressure sensing member of the plurality of linear shape pressure sensing members, and
  wherein movements of the linear shape pressure sensing members between the plurality of housing spaces are restricted by a partitioning portion, wherein the plurality of linear shape pressure sensing members are aligned in an alignment direction which intersects the closing moving direction of the sliding door and a longitudinal direction of the door front edge rubber member, and are not overlapped in the moving direction of the sliding door.

15. The pinch detection sensor according to claim 14, wherein each linear shape pressure sensing member accommodated in its respective housing space is movable in a width direction of the sliding door within the housing space.

16. The pinch detection sensor according to claim 14, wherein a length of each housing space of the plurality of housing spaces, in the width direction of the sliding door, in the movement direction of the sliding door, is greater than diameters of the linear shape pressure sensing members.

17. The pinch detection sensor according to claim 14, wherein each linear shape pressure sensing member of the plurality of linear shape pressure sensing members accommodated in each housing space of the plurality of housing space respectively, is movable in the width direction of the sliding door within each housing space of the plurality of housing spaces.

\* \* \* \* \*